UNITED STATES PATENT OFFICE.

THEODORE CLOUGH, OF NEW YORK, N. Y.

IMPROVEMENT IN PREPARING PETROLEUM FOR THE MANUFACTURE OF ILLUMINATING-GAS.

Specification forming part of Letters Patent No. 36,453, dated September 16, 1862.

*To all whom it may concern:*

Be it known that I, THEODORE CLOUGH, of the city and county of New York, State of New York, have invented a certain new and useful manufacture of a hydrocarbon oil suitable to be used for the manufacture of illuminating-gas; and I do hereby declare that the following is a full and correct description thereof.

I take crude petroleum and place it in a common still suitable for distilling hydrocarbon oils and apply heat gradually, raising the temperature until the more volatile matters and light-oil vapors of a boiling-point—about 600° Fahrenheit—are driven off from the mass acted on and until the remainder in the still, which is about thirty to thirty-five per cent. of the original charge, becomes of specific gravity about 28° to 30° Baumé. I stop the distillation at this point, and, having cooled down the still, draw off the remaining undistilled oil.

This oil, when cool, is mobile at about 60° Fahrenheit, and without further treatment is fit for sale and use as a gas-oil, and is manufactured into illuminating-gas in the same manner as rosin-oil by supplying a constant stream to a gas-retort such as used in the manufacture of rosin-oil gas.

The lighter bodies driven off by the distillation are well known in the arts and commercially as "naphtha" and "kerosene," the latter when purified suitable for burning-oil. To them I make no claim. Nor do I claim distilling petroleum in the manner described for the purpose of producing them; but I am not aware that the distillation of petroleum has ever before been arrested at the stage of the process above described, when the lighter bodies are driven over for the purpose of withdrawing the crude undistilled remaining oil, free from the presence of such lighter bodies, substantially, and therefore fit for gas making on account of the absence of such matters, which, if present, form oleaginous vapors when introduced into a gas-retort and crowd over with the permanent gas. The practice heretofore has been to continue the distillation to dryness or to nearly that point, leaving a viscid residue, the oil driven over being what is termed "heavy oil," having a boiling-point of about 800° to 900°. In the operation of driving over this heavy oil the crude petroleum in the still from which it comes is decomposed, breaking up into light and heavy oil vapors and permanent gas, throwing down carbonaceous matters. The permanent gas is a loss when it cannot be used. The heavy oil has to be redistilled to separate the light part, which is not fit or safe to be suffered to remain with the heavy oil, and the heavy oil then left, being a distilled oil, is necessarily deprived of valuable gas-making properties, at least to the extent of the permanent gas formed in the operation of distillation.

The object of my invention is the manufacture of oil suitable for gas-making from petroleum, which contains substantially all the available gas-making properties of crude petroleum, and is divested of such bodies which interfere with the process of gas-making.

In conducting the manufacture care should be taken to stop the distillation of the crude petroleum at such point as to free the crude petroleum of the lighter bodies above mentioned and yet leave the remaining undistilled oil sufficiently thin to be mobile at about 60° Fahrenheit, so that it can be run as an oil into a gas-retort suitable for making gas from oil.

I claim as a new manufacture—

The gas-making oil obtained by treating petroleum substantially as described.

THEODORE CLOUGH.

Witnesses:
F. C. TREADWELL, Junr.,
D. C. BIRDWELL.